United States Patent
Suzuki

(10) Patent No.: US 10,063,736 B2
(45) Date of Patent: Aug. 28, 2018

(54) INFORMATION PROCESSING APPARATUS AND CONTROL METHOD FOR PROVIDING A PRINT SETTING SCREEN TO BE DISPLAYED

(71) Applicant: CANON KABUSHIKI KAISHA, Tokyo (JP)

(72) Inventor: Shinya Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/381,471

(22) Filed: Dec. 16, 2016

(65) Prior Publication Data

US 2017/0180591 A1  Jun. 22, 2017

(30) Foreign Application Priority Data

Dec. 17, 2015  (JP) .................................. 2015-246773

(51) Int. Cl.
*H04N 1/32* (2006.01)
*G06F 3/12* (2006.01)
*H04N 1/00* (2006.01)

(52) U.S. Cl.
CPC ......... *H04N 1/32122* (2013.01); *G06F 3/121* (2013.01); *G06F 3/1225* (2013.01); *G06F 3/1254* (2013.01); *H04N 1/00464* (2013.01); *H04N 2201/0082* (2013.01)

(58) Field of Classification Search
None
See application file for complete search history.

(56) References Cited

U.S. PATENT DOCUMENTS

2003/0110412 A1*  6/2003  Neville ................ G03B 15/006
                                                 714/25
2014/0132978 A1*  5/2014  Igawa ................... G06F 3/1207
                                                 358/1.14

FOREIGN PATENT DOCUMENTS

JP  2007-058539 A  3/2007

\* cited by examiner

*Primary Examiner* — Thomas D Lee
(74) *Attorney, Agent, or Firm* — Canon U.S.A., Inc. IP Division

(57) ABSTRACT

An information processing apparatus accepts, on a print setting screen provided by a first application, an instruction that a browser displays information. If a second application that has issued a print instruction to a printer driver is determined to be a default browser of an operating system, a built-in browser of the first application displays information, and if the second application is determined to be not the default browser, the default browser displays the information.

11 Claims, 14 Drawing Sheets

INFORMATION PROCESSING APPARATUS AND CONTROL METHOD FOR PROVIDING A PRINT SETTING SCREEN TO BE DISPLAYED

BACKGROUND

Field of the Disclosure

The present disclosure relates to a technique for displaying information by a browser.

Description of the Related Art

Conventionally, there is known a technique for providing help information about a printer driver. Japanese Patent Application Laid-Open No. 2007-58539 discloses a technique for displaying a print condition setting screen of a printer driver from a help screen.

SUMMARY

In the present specification, for the purpose of improvement in a printer driver function, there is provided a function of accepting an instruction to display help information on a print setting screen of a printer driver and an instruction to display information of a printer by a browser through access to the printer. In response to a display instruction being accepted, a default browser of an operating system as the browser is launched.

The default browser can also issue a print instruction to the printer driver having such a function. When an instruction to display information by the browser is accepted on the print setting screen of the printer driver that has received the print instruction from the default browser, the information is displayed by the default browser that has issued the print instruction. As a result, depending on a displaying manner of the print setting screen, the print setting screen needs to be closed once to allow the user to operate the default browser, which impairs the user's convenience.

In view of this, the present disclosure is directed to improving user's convenience if an instruction to display information by a browser is accepted on a print setting screen of a printer driver that has received a print instruction from a default browser.

According to an aspect of the present disclosure, an information processing apparatus includes an accepting unit configured to accept, on a print setting screen provided by a first application, an instruction that a browser displays information; and a determination unit configured to determine, if the accepting unit accepts the instruction that the browser displays the information, whether a second application that has issued a print instruction to a printer driver is a default browser of an operating system, wherein if the determination unit determines that the second application is the default browser, the first application displays the information, and if the determination unit determines that the second application is not the default browser, the default browser displays the information.

Further functions of the present disclosure will become apparent from the following description of exemplary embodiments with reference to the attached drawings.

DESCRIPTION OF THE EMBODIMENTS

With the spread of tablet computers, in Windows (registered trademark, hereinafter omitted), Windows 8 and Windows 8.1 easy to operate on tablet computers have been released from Microsoft Corporation (registered trademark). Windows 8 and Windows 8.1 include not only a desktop user interface (UI) environment but also a full screen UI environment suitable for a touch operation. In each UI environment, two types of applications operate. The two types of applications include a desktop application with which display is presented in a window form and a Windows Store application (hereinafter referred to as a store application) with which display is presented in a full screen form. Depending on the UI environment, a different print setting screen for a printer driver is provided by either of the applications. Among such print setting screens, a print setting screen in the full screen UI environment is provided by a Windows Store Device Application (WSDA, hereinafter referred to as a device application). In the present exemplary embodiments, the device application is implemented as a kind of store application.

Further, Windows 10 has enhanced the store application functions, thereby allowing the store applications to be displayed not only on the conventional full screen form (hereinafter referred to as a tablet mode) but also on a window form (hereinafter referred to as a window mode).

This enhancement allows a user to select a display mode of the store application depending on the intended use. Further, Windows 10 provides a web browser (hereinafter simply referred to as a browser) serving as an application for browsing sites on the Internet as a store application. This store application is registered as a default browser for the operating system (hereinafter referred to as the OS) for opening an Internet site.

An explanation for the device application will be provided. The device application is an application for providing a print setting screen to be displayed when a print setting screen is opened from a store application. The print setting screen allows the user to change detailed print settings. The device application according to the present specification includes a so-called "help" function of providing the user with a function description.

Further, in the present specification, there is provided a web help function, on the device application, with which help information in a web site is viewed from a browser. In particular, for a help regarding a print setting function of the printer driver, where the print setting screen is operable while the user views the help. Therefore, the web help opened by the browser and the print setting screen can be displayed on the screen at the same time.

Figure 1:
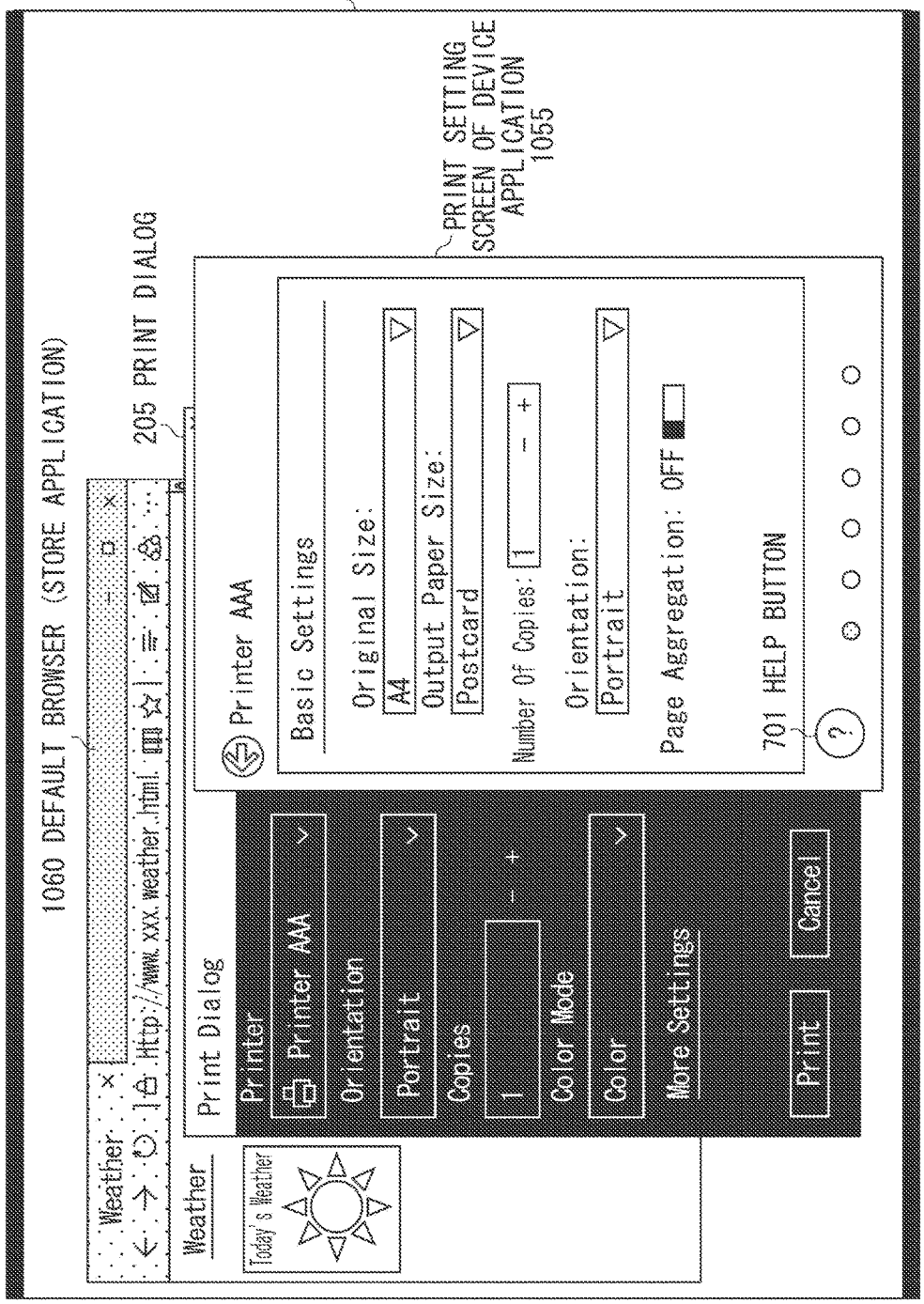
FIG. 1 is a diagram illustrating a print setting screen of a device application having a help display function according to one or more aspects of the present disclosure.
Figure 2:
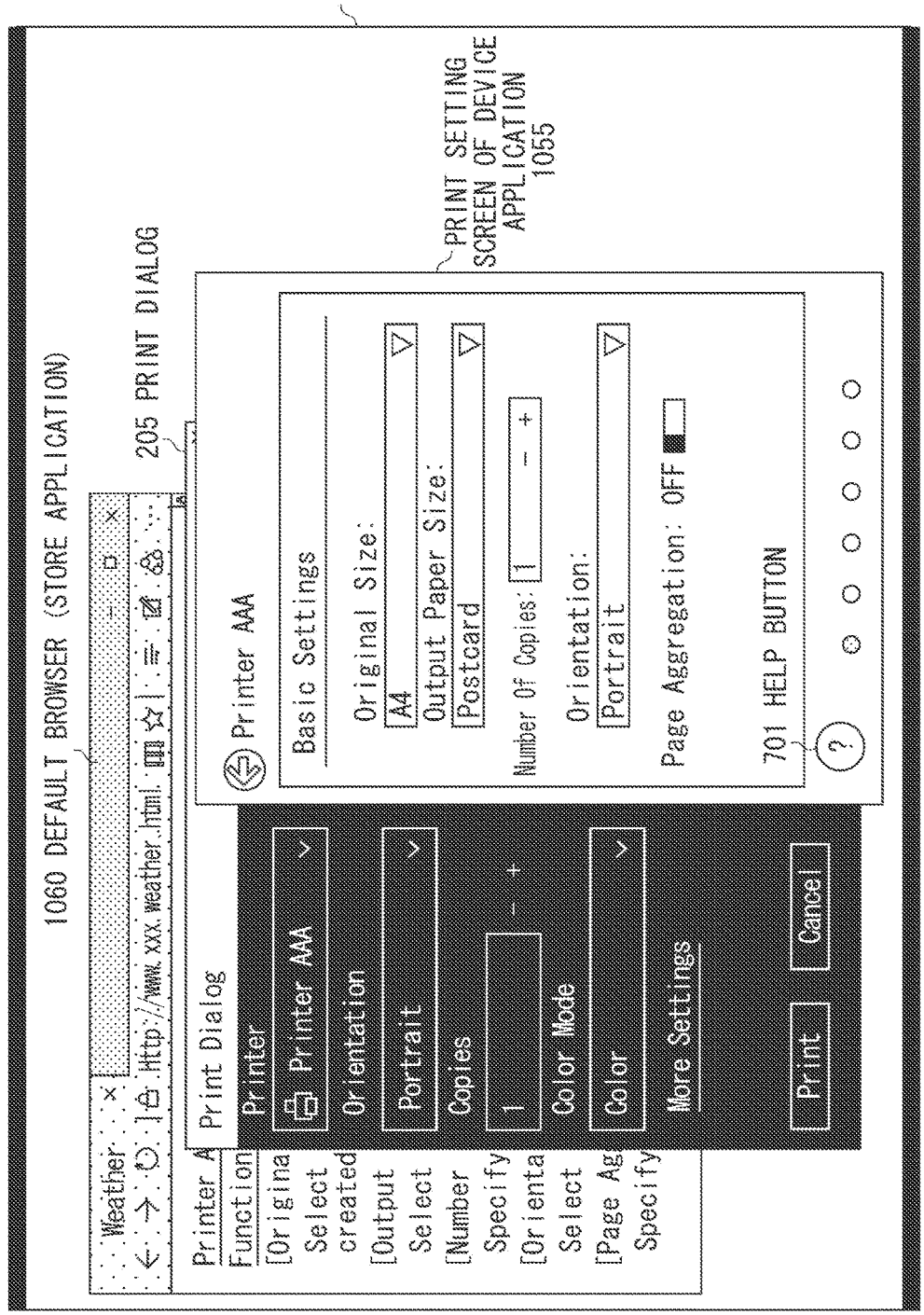
FIG. 2 is a diagram illustrating that a window displaying help cannot be operated when the help is opened by a default browser according to one or more aspects of the present disclosure.

However, when the web help is used from the device application, the print setting screen of the device application and the web help may not be able to be displayed on the same screen depending on the situation. With reference to FIGS. 1 and 2, an example of the situation will be described below.

FIG. 1 is a view in which a print dialog 205 is opened from a default browser 1060 and the print setting screen of the device application 1055 is called and displayed from the print dialog 205. In this state, a help button 701 is pressed to display the web help content using the default browser 1060. Then, the web help is opened by the default browser 1060, and the state transits to the state illustrated in FIG. 2. In FIG. 2, the web help content is opened in a new tab item in the default browser 1060. However, the device application 1055 is displayed in a state of "not accepting other operations while a dialog, i.e., so called a modal dialog, is being displayed". In this case, the default browser 1060 as the parent window cannot be operated, and as a result, the user cannot view the web help content displayed by the default browser 1060.

FIGS. 1 and 2 are a view explaining a situation that occurs in the window mode. An issue similar to that in the window mode does not occur in the tablet mode, but instead, the default browser 1060 is displayed on the full screen form. Thus the user cannot view the web help content and the print setting screen at the same time.

The following description uses an example of accepting an instruction to display the help content. An instruction to display any site, such as a manufacturer's product information site can also be accepted instead of accepting an instruction to display the help. The same applies to another configuration of accepting an instruction to display printer information by a browser through access to the printer (remote UI). The remote UI herein refers to a technique in which the printer operates as a web server, a printer IP address and the like are specified by a client, and whereby content, such as HTML, for displaying printer information is acquired and displayed by a browser.

Figure 3:
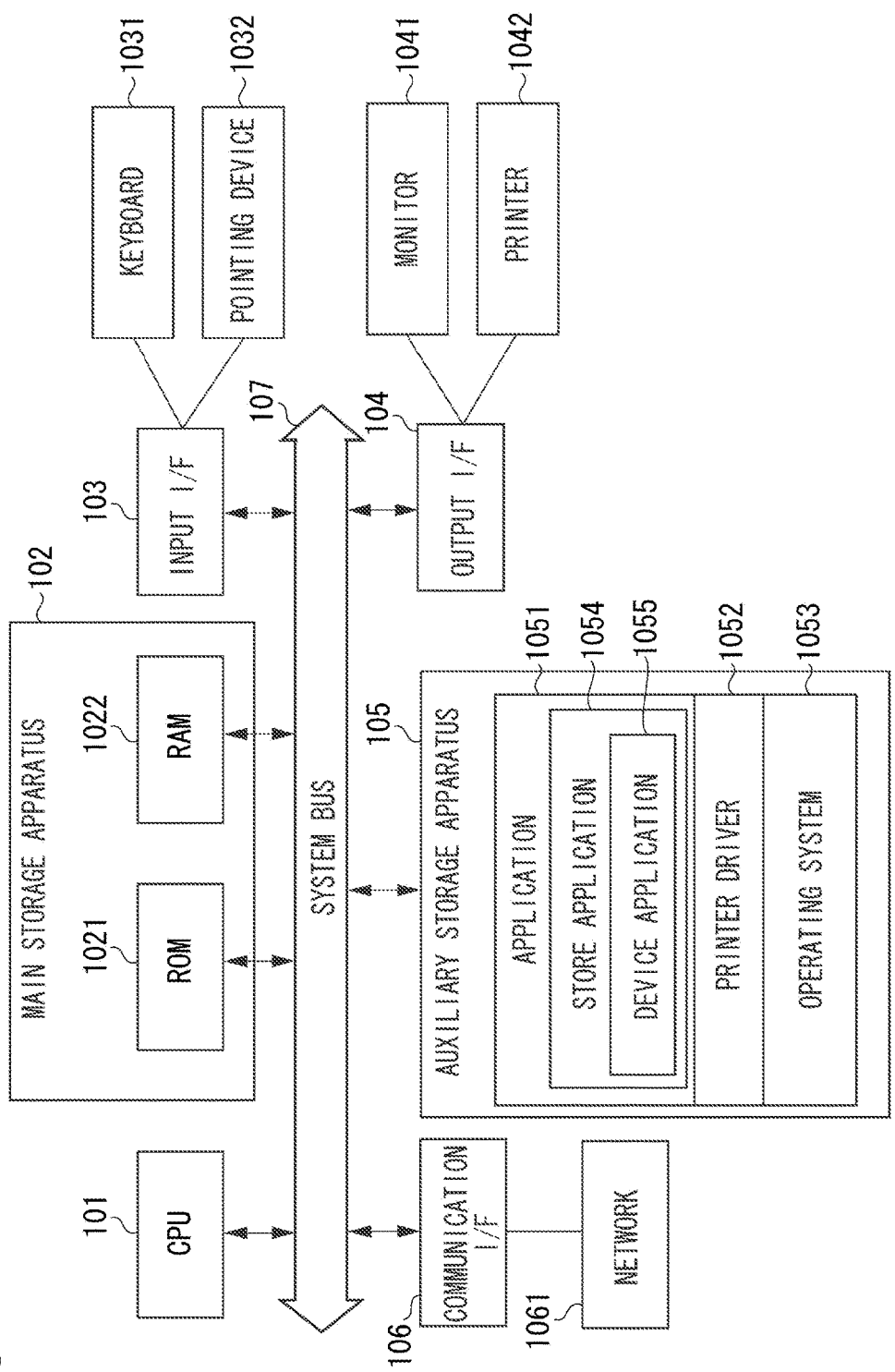
FIG. 3 is a block diagram of hardware and software of a computer system according to one or more aspects of the present disclosure.

FIG. 3 is a block diagram of a system using a computer (information processing apparatus) for implementing one or more aspects of the present disclosure.

The system includes a central processing unit (CPU) 101, a main storage apparatus 102, an input interface (I/F) 103, an output I/F 104, an auxiliary storage apparatus 105, a communication I/F 106, and a common data system bus 107. The CPU 101 controls the entire apparatus according to programs stored in a read-only memory (ROM) 1021 or a random access memory (RAM) 1022 of the main storage apparatus 102 or programs stored in the auxiliary storage apparatus 105. The RAM 1022 is also used as a work area to be used by the CPU 101 for various processes. Processing of each component in a first exemplary embodiment is performed such that the CPU 101 reads the programs into the RAM 1022. The auxiliary storage apparatus 105 stores an application 1051, a printer driver 1052, an operating system (OS) 1053, and the like. The application 1051 includes a desktop application (unillustrated), which is for an operation with a connected mouse, and a store application 1054 which is for a touch operation. The application 1051 further includes the device application 1055 for providing a print setting screen which is used when printing is instructed from the store application 1054. The printer driver 1052 can issue a print instruction to a device having a printing function. The input I/F 103 serves as a device for allowing the user to provide various instructions to the computer using a keyboard 1031 and a pointing device 1032, such as a mouse and a touch panel. The output I/F 104 is an interface for externally outputting data and outputs data to an output device, such as a monitor 1041 and a printer 1042. The output I/F 104 is directly connected to the printer 1042 with a local input/output (I/O) device. Alternatively, the output I/F 104 is connected to the printer 1042 via a network 1061 which is connected to the system via the communication I/F 106. In addition, the common data system bus 107 is used by the I/F devices and modules for data transfer therebetween.

The CPU 101 executes processing based on the programs stored in the auxiliary storage apparatus 105, thereby to achieve the process of each step in the flowchart to be described below.

Figure 4:
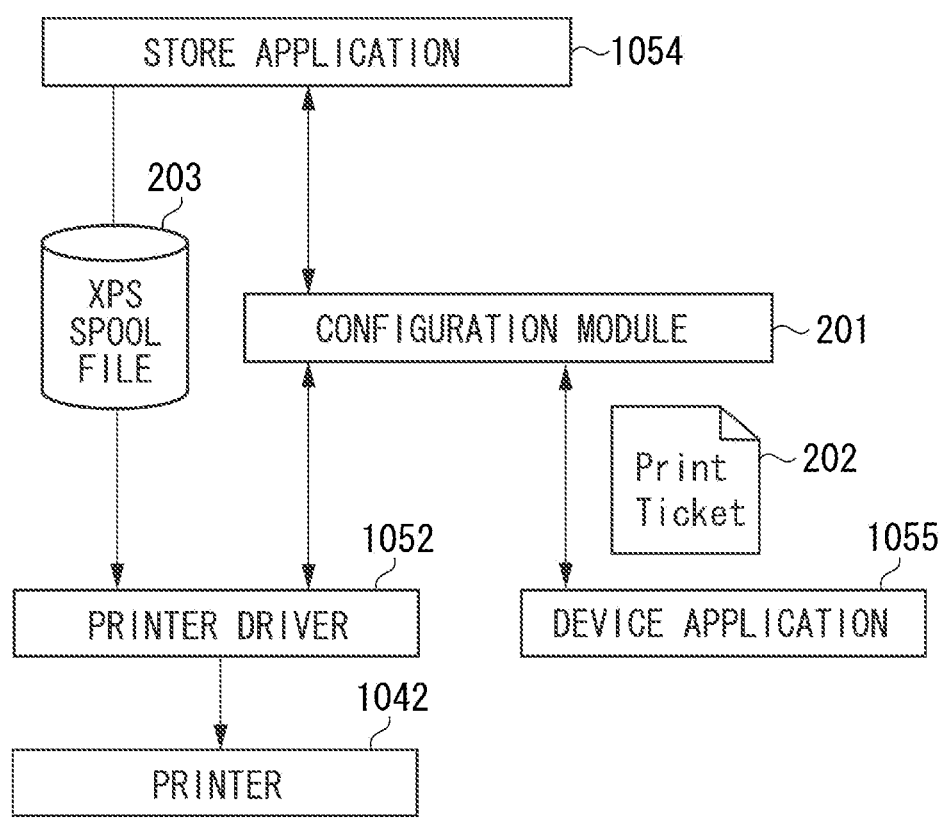
FIG. 4 is a block diagram of software modules of a print processing system according to one or more aspects of the present disclosure.

FIG. 4 is a block diagram illustrating an example of a software module according to one or more aspects of the present disclosure. The basic configuration of the block diagram includes the printer driver 1052, the store application 1054, the device application 1055, and a configuration module 201 as an OS module. These software modules are stored in the auxiliary storage apparatus 105 and are loaded from the auxiliary storage apparatus 105 into the RAM 1022 in response to a user request and other system requests to be executed by the CPU 101.

The store application 1054 displays a UI on the monitor 1041 and accepts a print setting request from the user through the input device, such as the pointing device 1032 and the keyboard 1031. In response to the print setting request from the user, the store application 1054 calls the configuration module 201 as the OS module. The configuration module 201 is interposed between the store application 1054 and the printer driver 1052 to perform common processes across the printing processes. The specific examples thereof include selecting a print target printer and generating a PrintTicket 202 using the selected printer driver 1052. The configuration module 201 generates the PrintTicket 202 from a print setting definition file called a generic printer description (GPD) defined by the printer driver 1052. When a request to display further more detailed print setting screen is accepted from the user, the configuration module 201 calls the device application 1055 and at the same time, passes the PrintTicket 202 generated.

The device application 1055 is a store application used in cooperation with the printer driver 1052. The device application 1055 can be called by the following three methods. In the first method (A), the device application 1055 is called from a home screen like a general store application 1054. In The second method (B), the device application 1055 is called by an operation on the print dialog 205 of the OS 1053 for displaying the print setting screen as described above. In the third method (C), the device application 1055 is called by opening of a file with an extension associated with the device application 1055. Of the above methods, the method (A) is not directly related to the present specification and thus the description thereof is omitted.

In the present specification, a screen displayed by the method (B) is referred to as a print setting screen, and a screen area displayed by the method (C) is referred to as a main screen display section. In the present specification, the main screen display section displayed by the method (C) is called from the print setting screen displayed by the method (B), and the details will be described later.

The device application 1055 analyzes the print setting information of the received PrintTicket 202 and displays the print setting screen for the user. When the print setting process is completed by a user operation, the device application 1055 reflects the print setting information changed by the user on the PrintTicket 202 and passes the PrintTicket 202 to the configuration module 201.

When a print instruction is received from the user, the configuration module 201 reflects information of the Print-Ticket 202 on an XML Paper Specification (XPS) spool file 203 generated by the store application 1054 and passes the XPS spool file 203 to the printer driver 1052. The XPS is an XML-based document file format and is used as a spool file from a driver. The printer driver 1052 can convert the received XPS spool file 203 to an appropriate page description language (PDL) and send to the printer 1042 for printing.

Figure 5:
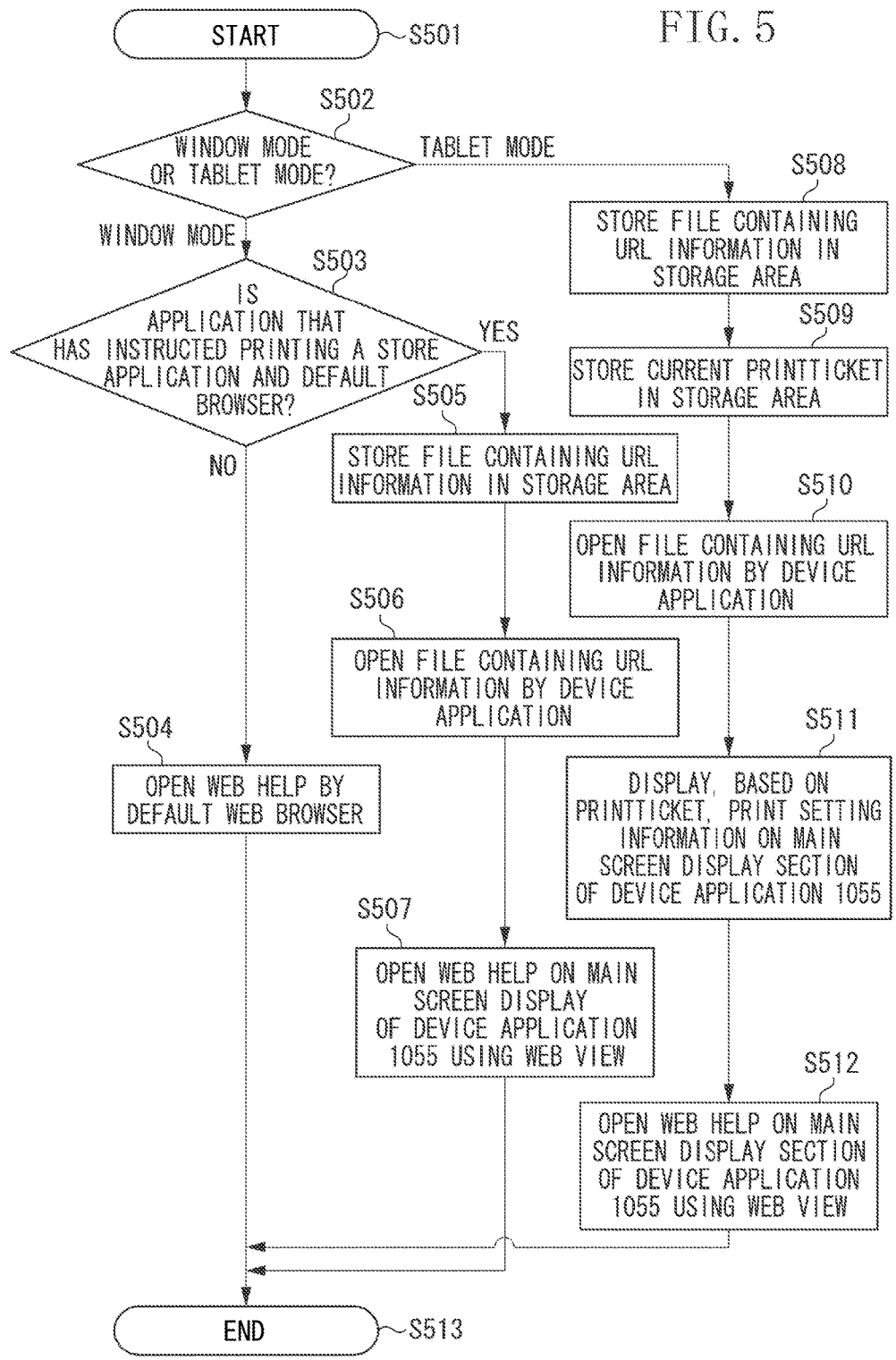
FIG. 5 is a flowchart illustrating a help display procedure according to one or more aspects of the present disclosure.
Figure 6:
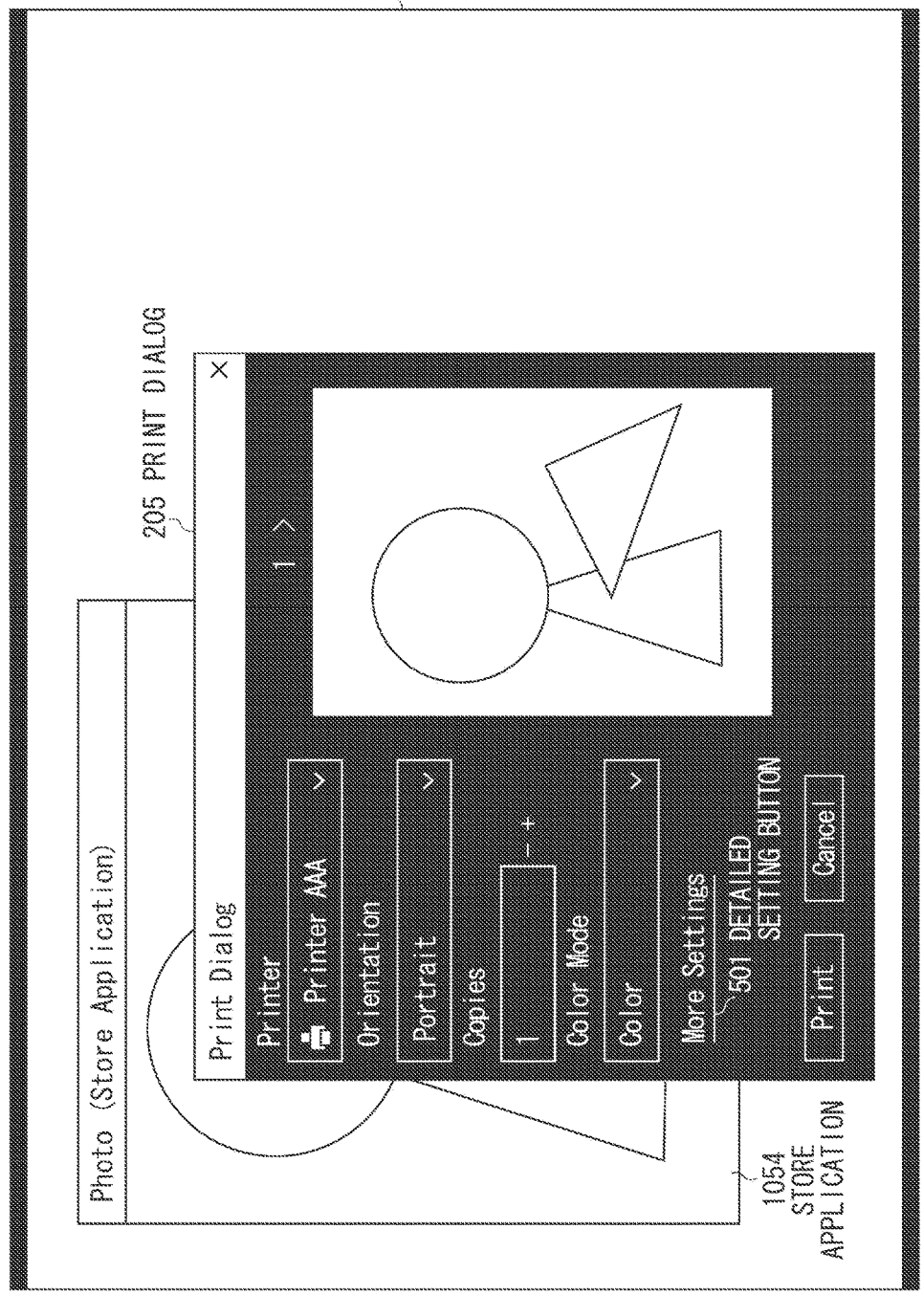
FIG. 6 is a diagram illustrating a print dialog display screen of an OS in a window mode according to one or more aspects of the present disclosure.
Figure 7:
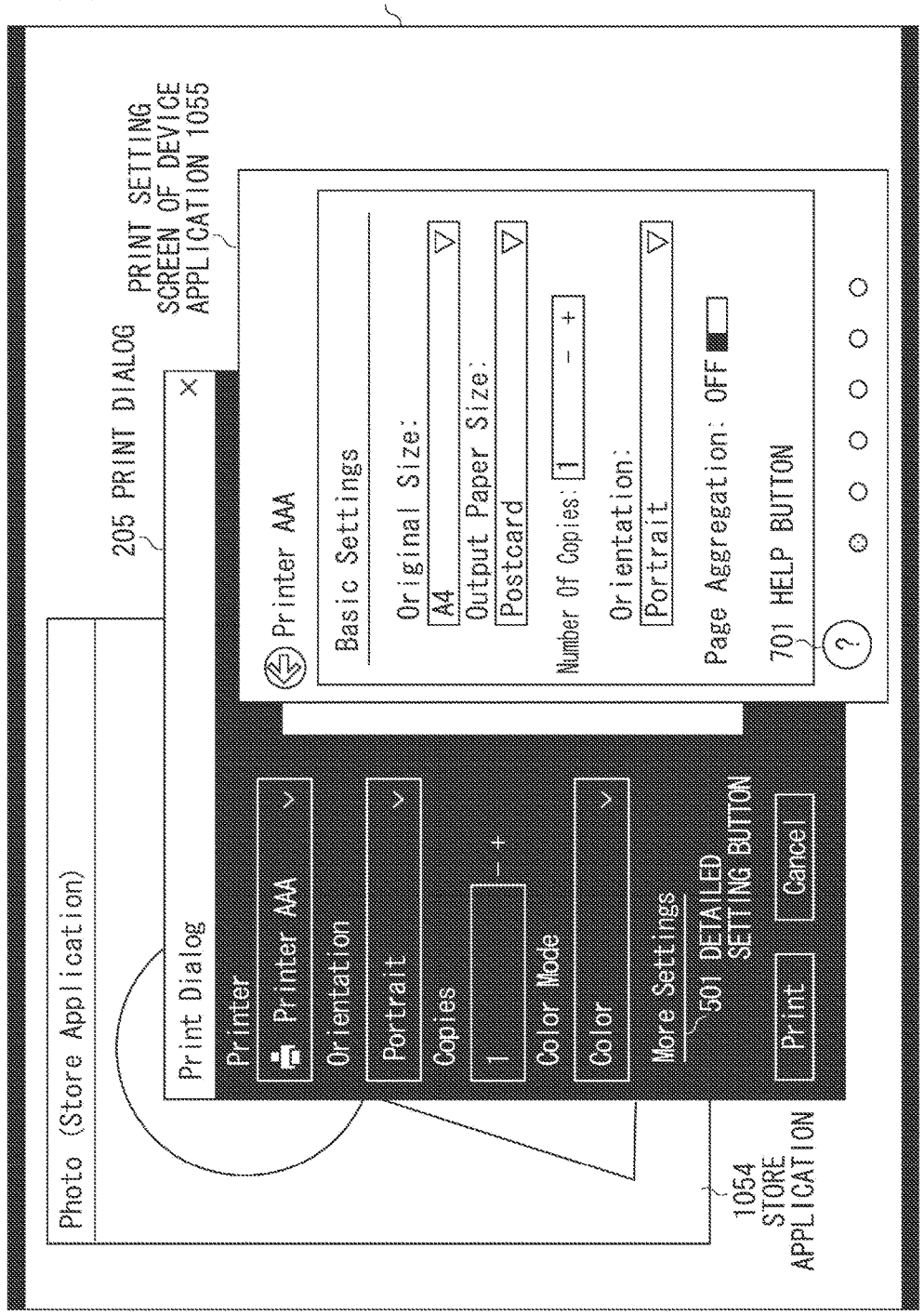
FIG. 7 is a diagram illustrating a print setting screen of a device application in the window mode according to one or more aspects of the present disclosure.
Figure 8:
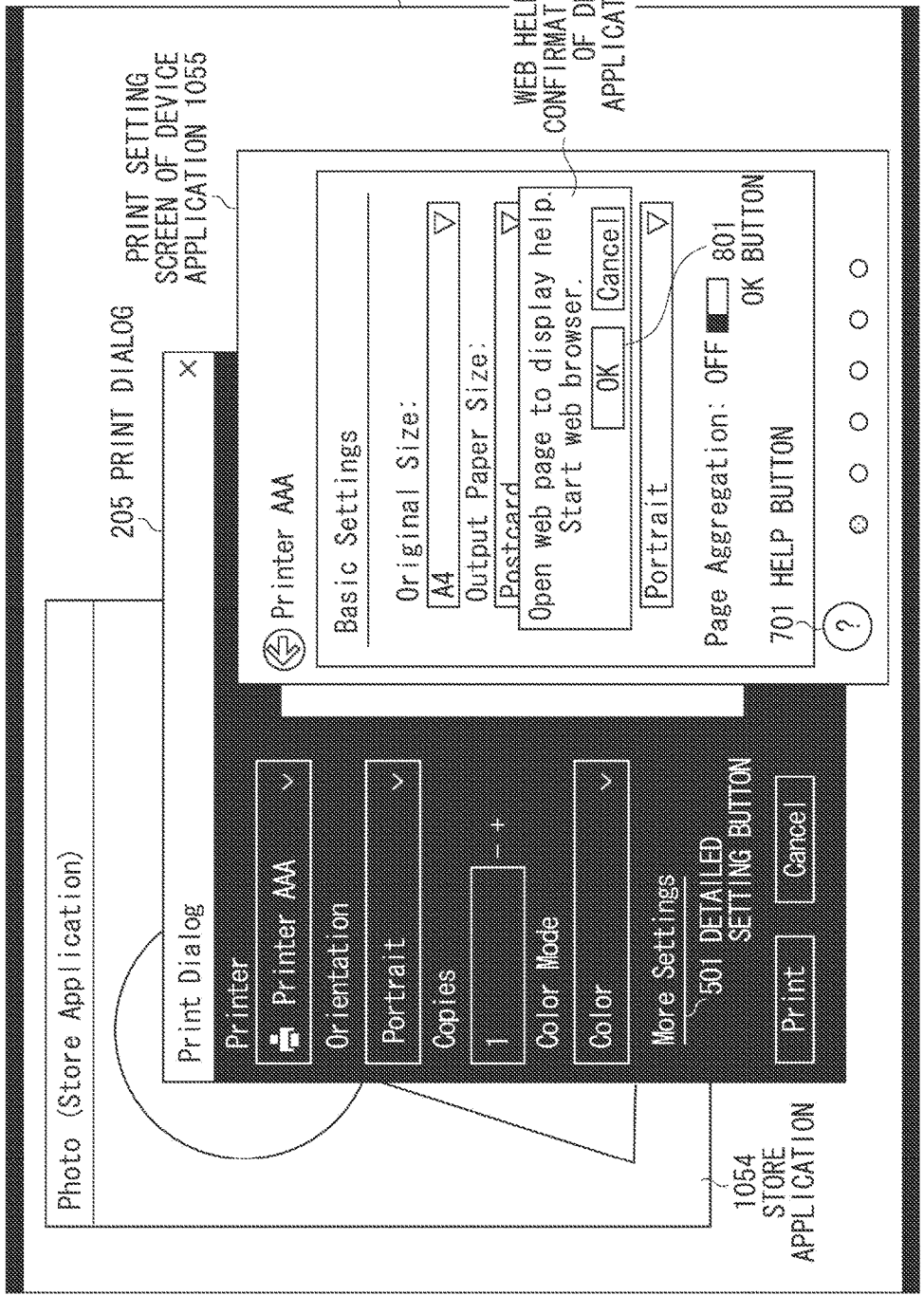
FIG. 8 is a diagram illustrating a help display confirmation dialog screen of the device application in the window mode according to one or more aspects of the present disclosure.

With reference to the flowchart in FIG. 5, the description on the outline of a web help display procedure by the device application 1055 will be provided. Before the process starts, the OS 1053 receives a print setting change instruction from the store application 1054 and displays the print dialog 205 (FIG. 6). Then, when the user presses a detailed setting button 501, the OS 1053 calls the device application 1055. When called by the OS 1053, the device application 1055 analyzes the information of the PrintTicket 202 received from the OS 1053 and displays the print setting screen (FIG. 7). Then, when the user presses the help button 701, the device application 1055 displays a web help display confirmation dialog (FIG. 8). Then, the device application 1055 receives a pressing operation by the user on an OK button 801 on the web help display confirmation dialog. Then, the device application 1055 accepts the help information display instruction from a browser on the print setting screen and starts the process of the web help display procedure (step S501). Subsequently, each process of the flowchart is executed by the device application 1055.

The OS 1053 allows the user to select the display mode between the window mode and the tablet mode. In the present specification, the process to be executed is changed according to which display mode is selected. Thus, when the process stars in step S501, in step S502, a determination of whether the display mode of the current OS 1053 is the window mode or the tablet mode is performed. The determination of the display mode is performed in the case of Windows 10. In the case of Windows 8 or Windows 8.1, the display mode is automatically determined to be the tablet mode, and then the processing proceed to step S508.

If the display mode is determined to be the window mode, the processing proceeds to step S503 (WINDOW MODE in step S502). In step S503, a determination of whether the application that has issued a print instruction to the printer driver 1052 is the store application 1054 and is the OS default browser. It may be determined simply whether or not the application is the OS default browser without determining whether or not the application is the store application 1054.

If it is determined that the application that has issued a print instruction to the printer driver 1052 is the store application 1054 and is the OS default browser (YES in step S503), the processing proceeds to step S505.

In step S505, the device application 1055 stores a file containing uniform resource locater (URL) information in a storage area. This URL information is a character string for identifying resource information which indicates the location on the Internet of where a web help related to the driver is arranged and is held in advance by the device application 1055. The storage area herein refers to the auxiliary storage apparatus 105. The storage area may be any area as long as the area can be accessed by the device application 1055.

In step S506, a specific extension associated with device application 1055 is set and the device application 1055 opens the file containing the URL information for the web help content. Then, the device application 1055 is called and the main screen display section is displayed. The device application 1055 has a function of opening the file with a specific extension containing the URL information and implements the process of displaying the main screen display section of the device application 1055 using an application programming interface (API) supported by the OS 1053.

Figure 10:
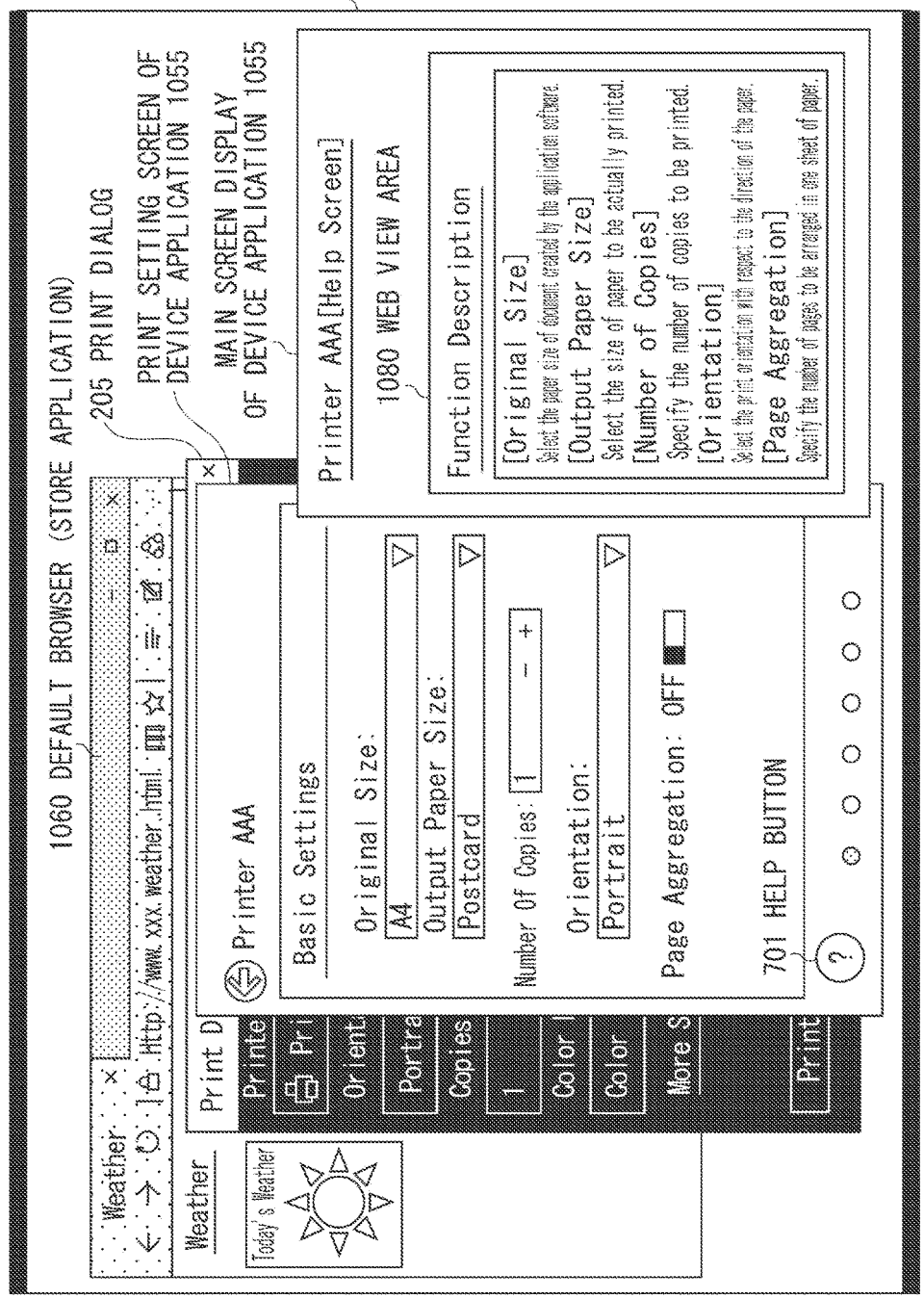
FIG. 10 is a diagram illustrating a help display screen of a device application in the window mode according to one or more aspects of the present disclosure.

In step S507, the device application 1055 displays the help information by a built-in browser of the device application 1055. The built-in browser herein usually refers to a function of displaying content of, for example, an Internet or local HTML, which is normally to be displayed by a browser in a display area of an application other than a browser having the main purpose of browsing through the Internet. More specifically, in step S507, the device application 1055 analyzes the URL information of the file, and then based on the analyzed URL information, accesses a server providing the web help content using a web view area 1080 to display the web help content in the main screen display section. The web view area 1080 is prepared in the main screen display section of the device application 1055 in advance, and the web help can be displayed by specifying the URL information acquired from the URL information file for the web view area 1080. In the case of the present processing, the store application 1054 that has issued the print instruction is the default browser 1060. Thus, the web help is displayed in the main screen display of the device application 1055 and therefore the web help and the print setting screen of the device application 1055 can be displayed next to each other (FIG. 10). Then, the processing proceeds to step S513, and the web help display process ends.

Figure 9:
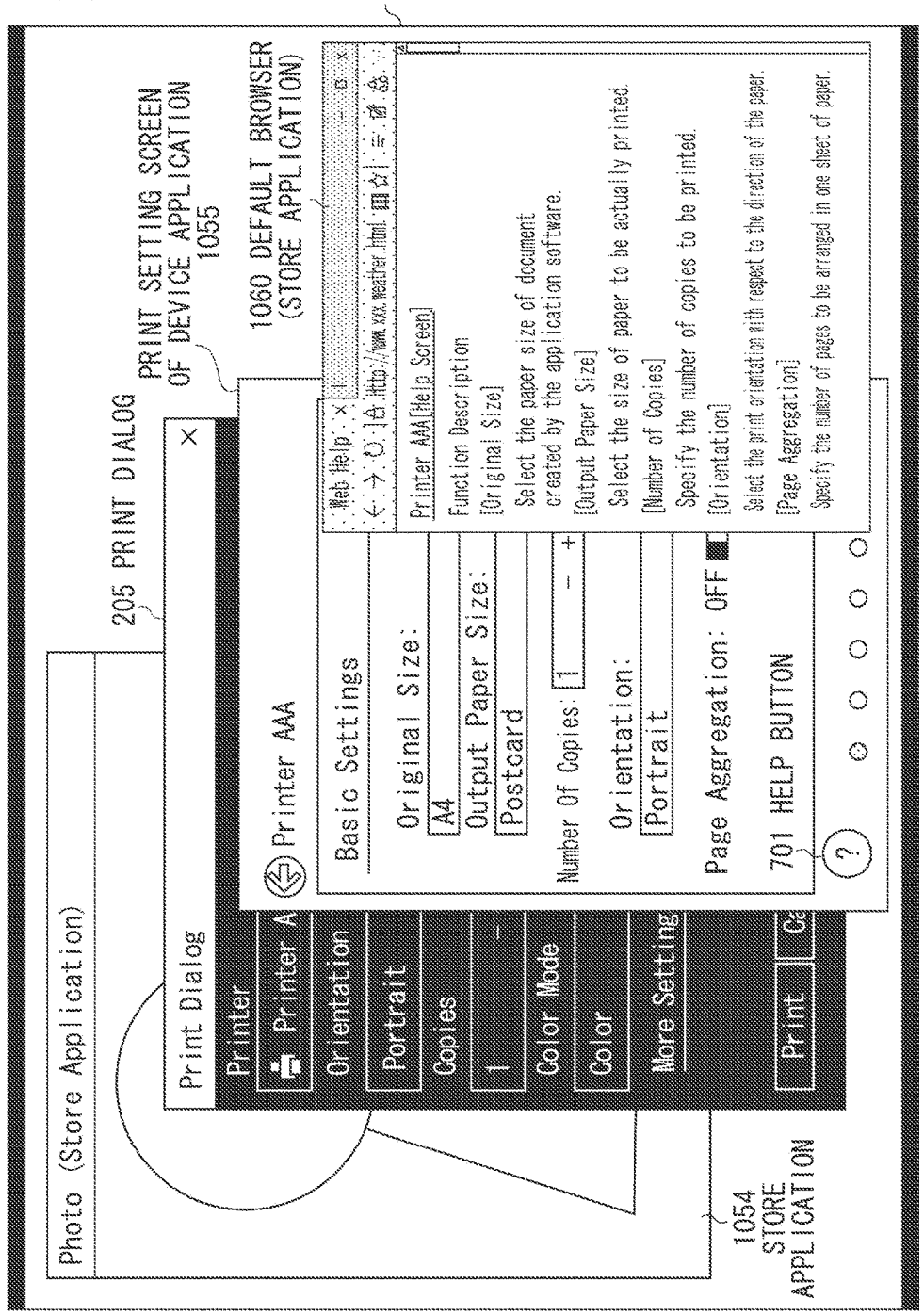
FIG. 9 is a diagram illustrating a help display screen of the default browser in the window mode according to one or more aspects of the present disclosure.

If it is determined that the application that has issued the print instruction is not the store application 1054 or is not the default browser (NO in step S503), the processing proceeds to step S504. In step S504, the device application 1055 issues an instruction to open the web help to the default browser 1060. Then, the default browser 1060 displays the help information. More specifically, the device application 1055 sends the URL information of the web help to the default browser 1060. Then, the default browser 1060 is displayed as a new window by the OS 1053 (FIG. 9). In the case of the present processing, the store application 1054 that has issued the print instruction is different from the default browser 1060, and thus the default browser 1060 and the print setting screen of the device application 1055 can be displayed next to each other. Then, the processing proceeds to step S513, and the web help display process ends.

In step S502, the determination of whether the display mode of the current OS is the window mode or the tablet mode is performed. If it is determined that the display mode is the tablet mode (TABLET MODE in step S502), the processing proceeds to step S508. The processing of the S508 is the same as that of S505.

In step S509, the current PrintTicket 202 is stored in the storage area. More specifically, the PrintTicket 202 is stored in the storage area as a file with a file name having a specific globally unique identifier (GUID) added thereto.

The processing of the S510 is the same as that of S506, and the device application 1055 opens the file containing the URL information.

In step S511, based on the PrintTicket 202 stored in step S509, the device application 1055 displays a print setting section 1301 which is an area for the user to perform a print setting in the main screen display section of the device application 1055. The PrintTicket 202 stored in step S509 is specified with the file name containing the GUID added in step S509.

In step S512, like in step S507, the device application 1055 opens the web help content using the WebView in the main screen display section of the device application 1055.

Figure 13:
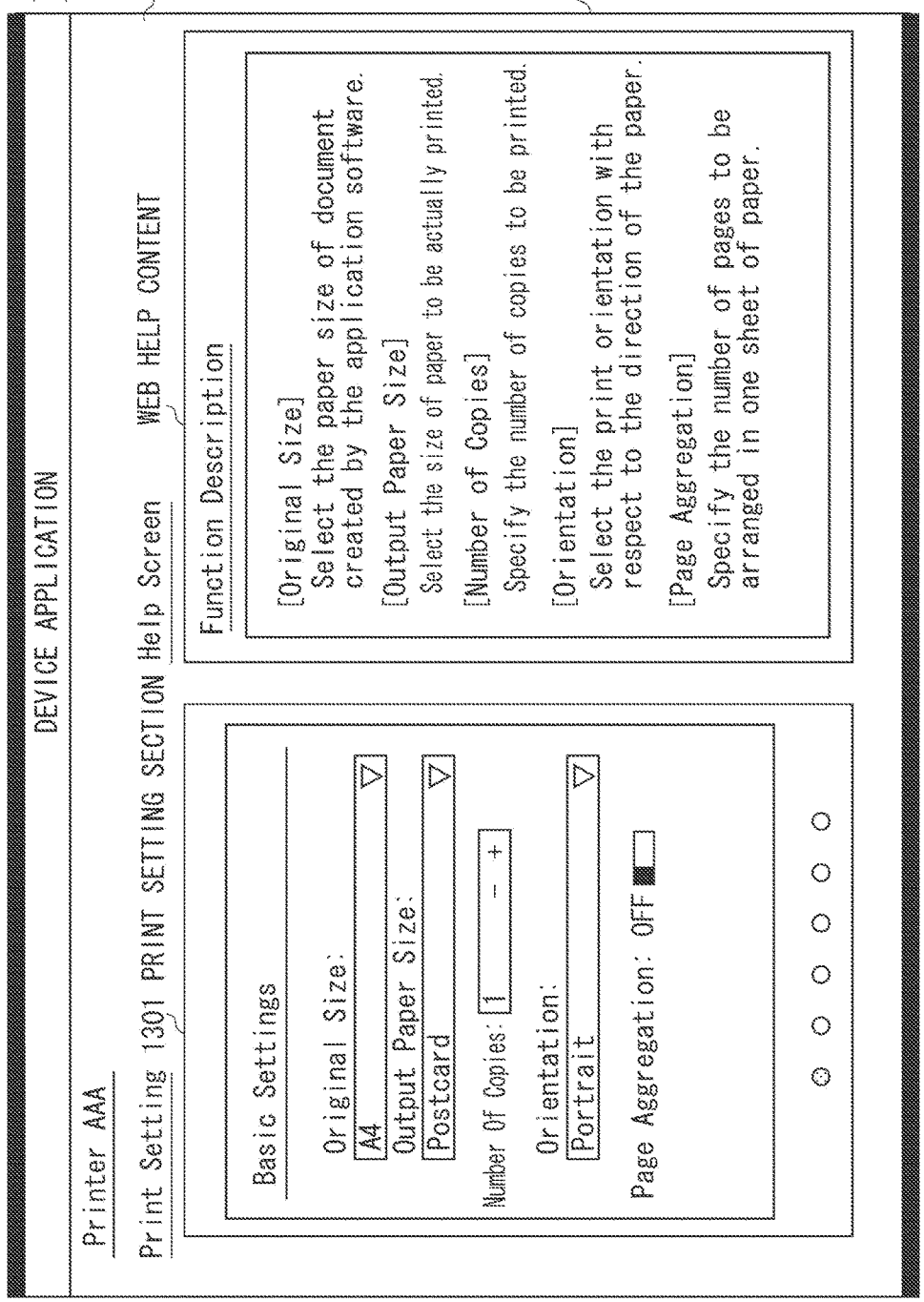
FIG. 13 is a diagram illustrating a print setting screen and a help screen of a device application in a tablet mode according to one or more aspects of the present disclosure.

This process allows the print setting section to be displayed together with the help information in the main screen display section of the device application 1055 using one window (FIG. 13). The user changes the print settings by operating the web help and fixes the print settings by operating a back button and the like. After the print settings are fixed, the device application 1055 overwrites the original PrintTicket 202 with the changed PrintTicket 202 and closes the main screen display section. Then, the screen returns to the screen in FIG. 7, and the device application 1055 reflects the print settings fixed in the main screen display section on the print setting screen and thereby can adopt the print settings changed in the main screen display section. Then, in step S513, the web help display procedure ends.

The above process allows the user to simultaneously view the print setting screen and the web help in a variety of situations and thereby provides the user with an efficient support for changing the print settings.

In order to implement the web help, the computer needs to be free from restrictions on network connection. Especially in an office environment, some environments may not be connected to the Internet site depending on the settings of a proxy server, which raises an issue in that the web help cannot be displayed if the network connection is disabled. In view of this, in a second exemplary embodiment, an explanation will be provided for processing of displaying the help information even if the network connection is disabled.

Figure 14:
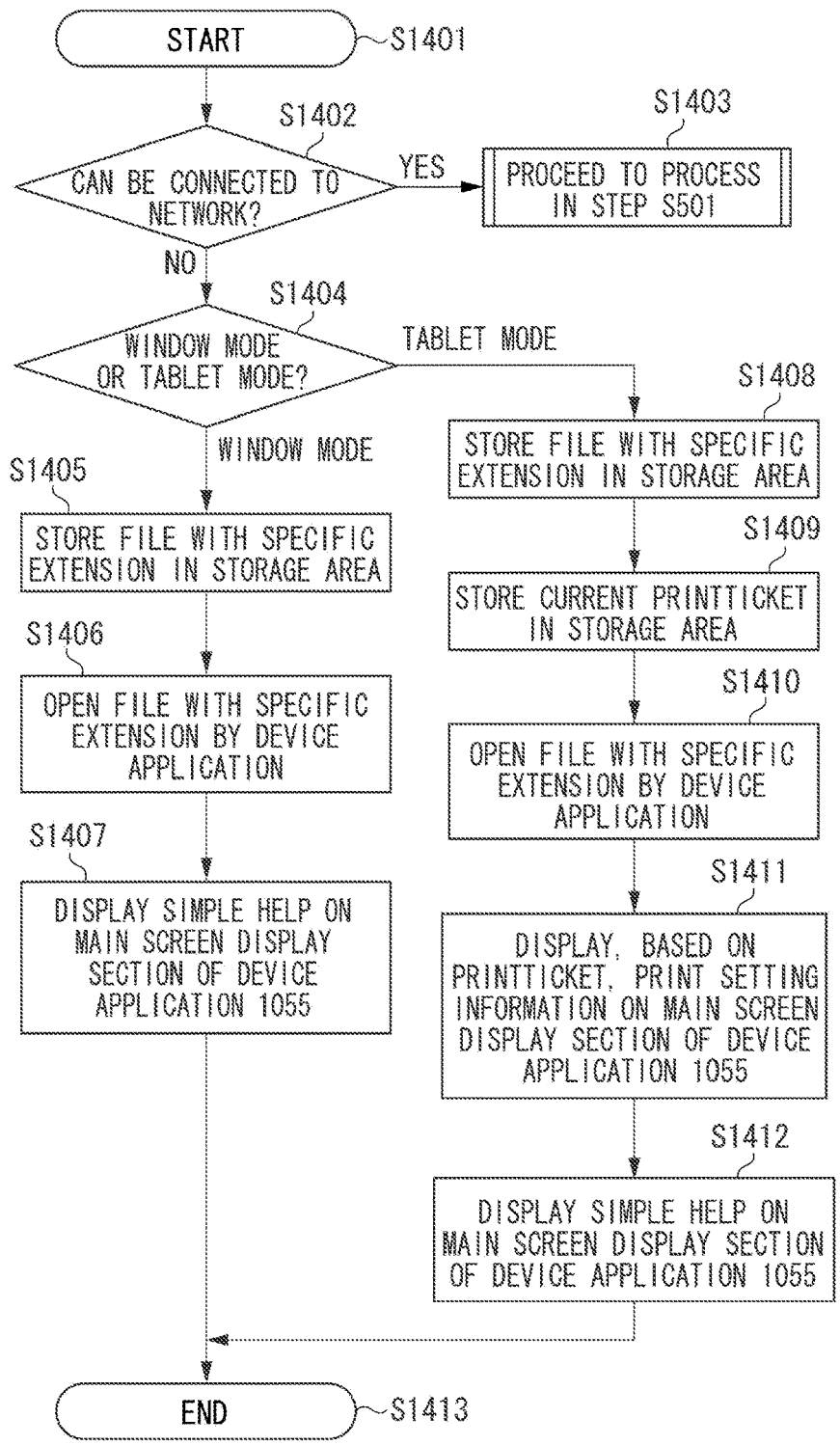
FIG. 14 is a flowchart illustrating a help display procedure including a determination of network connection according to one or more aspects of the present disclosure.

With reference to the flowchart in FIG. 14, the description on the outline of a web help display procedure considering the network connection of the device application 1055 will be provided. The operation procedure before the start of the present process is the same as the one described with reference to FIG. 5. After the display transits from the one illustrated in FIG. 6 to the one illustrated in FIG. 7 and then to the one illustrated in FIG. 8, if the device application 1055 determines that the user presses the OK button 801 in the web help display confirmation dialog, in step S1401, the device application 1055 starts the process of the web help display procedure. Subsequently, each process of the flowchart is executed by the device application 1055.

When the process stars in step S1401, in step S1402, a determination of whether network connection is enabled is performed. The device application 1055 determines whether the current computer can establish a network connection using an API of the OS 1053 and the established network connection is free from any restrictions.

If it is determined that network connection is enabled (YES in step S1402), the processing proceeds to step S1403. The process in step S1403 is the same as the one described in steps from S501 to S513, and thus the description thereof is omitted.

If it is determined that that network connection is not enabled (NO in step S1402), the processing proceeds to step S1404.

In step S1404, a determination of whether the current display mode of the OS 1053 is the window mode or the tablet mode is performed.

If the display mode is determined to be the window mode (WINDOW MODE in step S1404), the processing proceeds to step S1405.

In step S1405, the device application 1055 stores the file with a specific extension in the storage area. The file with this specific extension is associated with the device application 1055 in the same manner as the file described with reference to FIG. 5.

In step S1406, the device application 1055 opens the file with the specific extension.

In step S1407, the device application 1055 displays a local simple help screen held by the device application 1055 in the main screen display section of the device application 1055. The web help allows the help information to be arranged in the Internet sites and thus has no capacity limit. On the other hand, the device application 1055 has a limited amount of information to be held therein and thus cannot have all help information locally. Therefore, the device application 1055 prepares a simple help, such as displaying only sentences describing simple functions, to be provided to the users. Then, in step S1413, the help display procedure ends.

If the display mode is determined to be the tablet mode (TABLET MODE in step S1404), the processing proceeds to step S1408.

The processes in steps from S1408 to S1412 are the same as the ones in steps S1405, S509, S1406, S511, and S1407 respectively, and thus the description thereof is omitted. Then, in step S1413, the help display procedure ends.

With the above described procedure the web help display is changed according to the presence or absence of network connection. If there is a limit on the network connection, simple help information can be displayed together with the print setting screen.

According to the first exemplary embodiment, the determination processing in steps S502 and S503 is performed to determine whether or not to display the help information by the default browser.

Figure 11:
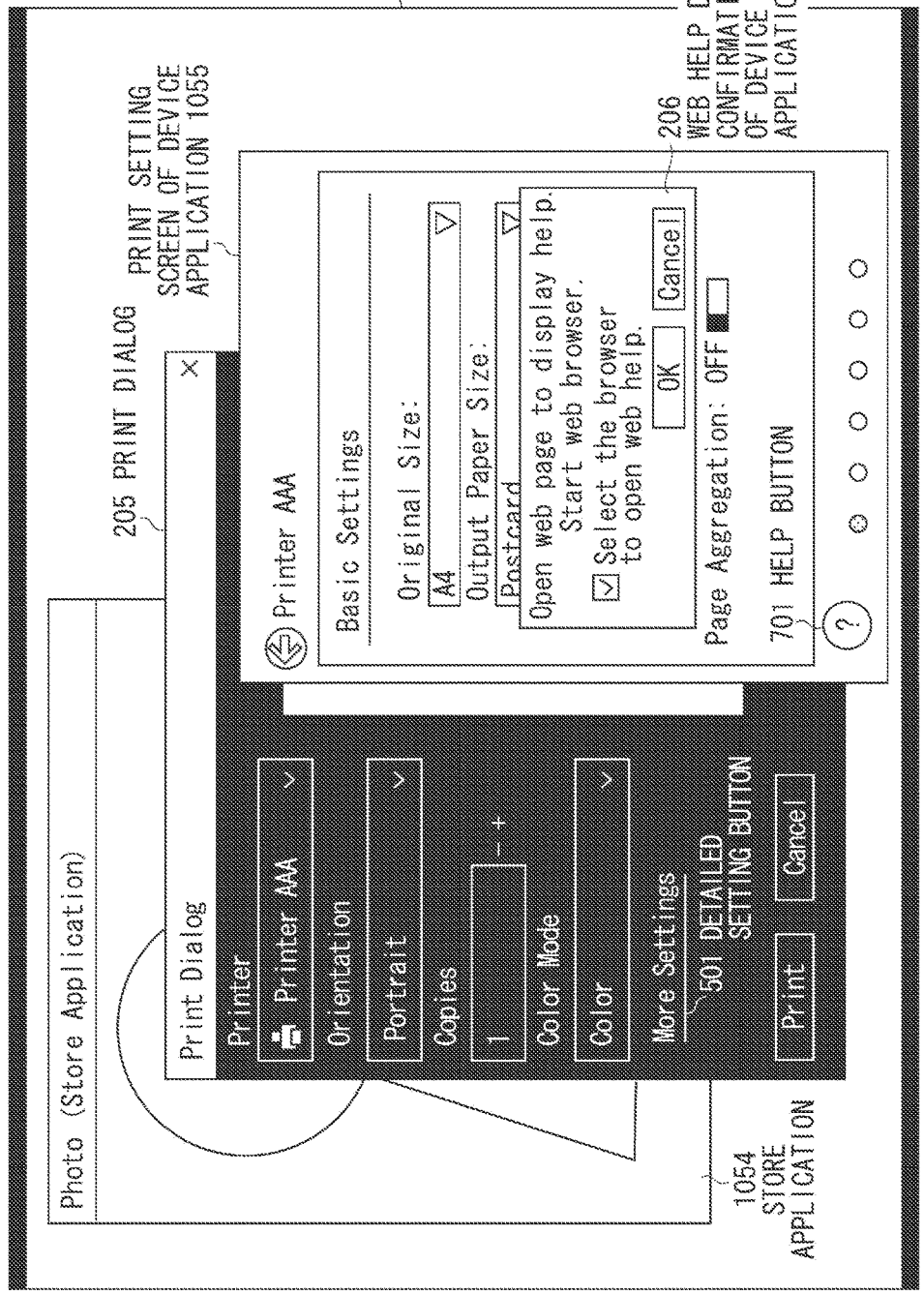
FIG. 11 is a diagram illustrating a dialog screen for confirming whether a user selects a browser to open a help according to one or more aspects of the present disclosure.
Figure 12:
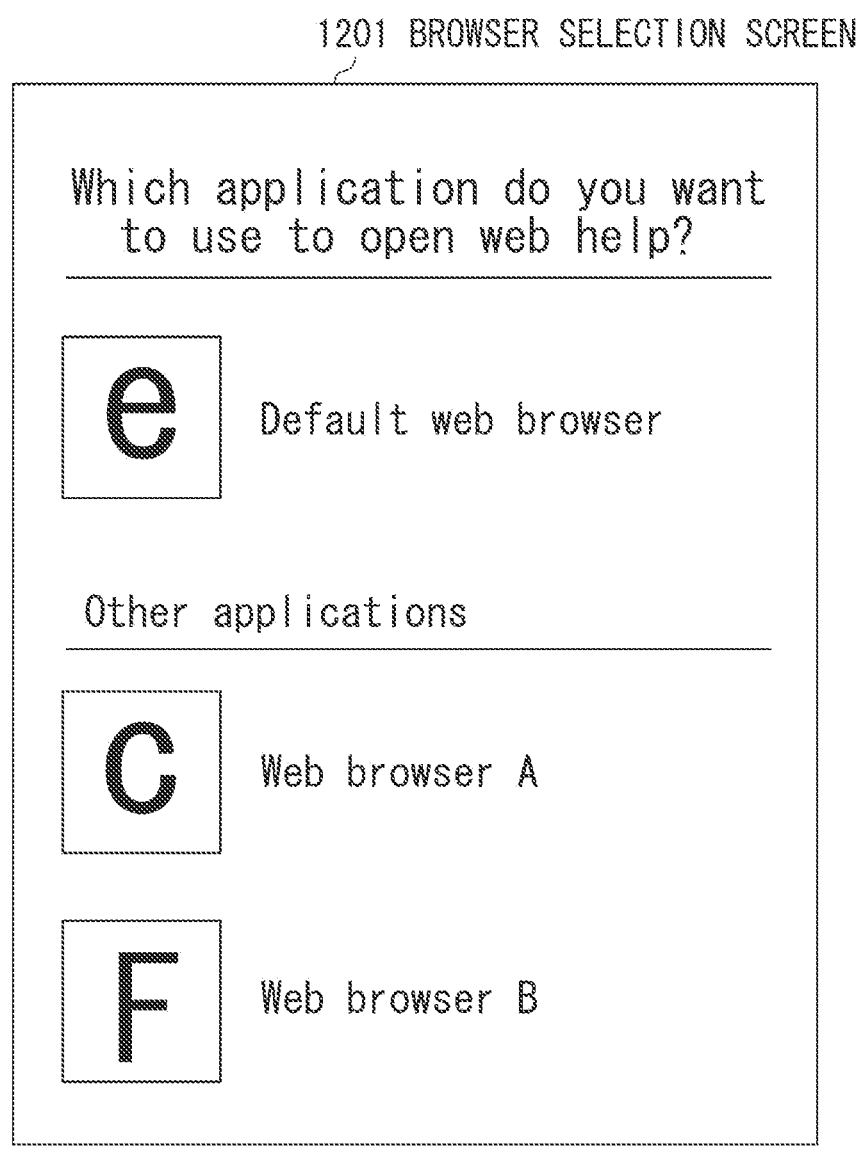
FIG. 12 is a diagram illustrating a browser selection screen according to one or more aspects of the present disclosure.

The first exemplary embodiment is not limited to this, but may be configured such that the user can optionally select a browser for displaying the web help. For example, as illustrated in FIG. 11, the web help display confirmation dialog of the device application 1055 includes a check box saying "Select the browser to open the web help". If the check box has been set to be valid, a browser selection screen as illustrated in FIG. 12 is displayed so that the user may select the browser for opening the web help from among installed browsers. Then, the user selects the browser for opening the web help. Based on the selection, the browser for opening the web help is determined and the web help is opened using the determined browser. Then, even if the application that has issued the print instruction is the store application 1054 and the default browser, the user can manually select a browser other than the default browser. As a result, this eliminates the issue described in FIG. 2, and the user can view the help information without closing the print setting screen of the device application 1055.

The present disclosure may be implemented in such a manner that a program for achieving one or more functions of the above described exemplary embodiments is supplied to a system or an apparatus via a network or a storage medium, and one or more processors in a computer of the system or the apparatus read and execute the program. Alternatively, the present disclosure may be implemented by a circuit (for example, an application specific integrated circuit (ASIC)) for achieving one or more functions.

The present disclosure improves user's convenience if an instruction to display information by a browser is accepted on a print setting screen of a printer driver that has received a print instruction from a default browser.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2015-246773, filed Dec. 17, 2015, which is hereby incorporated by reference herein in its entirety.

What is claimed is:

1. An information processing apparatus comprising:
a processor; and
a memory having stored thereon instruction that when executed by the processor cause the information processing apparatus to:
accept, on a print setting screen provided by a first application, an instruction causing a browser to display information; and
determine, if the instruction causing the browser to display the information is accepted, whether a second application that has issued a print instruction to a printer driver is a default browser of an operating system,
wherein if determined that the second application is the default browser, the first application displays the information, and if determined that the second application is not the default browser, the default browser displays the information.

2. The information processing apparatus according to claim 1, wherein in displaying the information by the first application, the first application opens a file with an extension associated with the first application and displays the information based on the file by a built-in browser.

3. The information processing apparatus according to claim 1,
wherein determine further determines whether the second application is a specific type of application and the second application is the default browser of the operating system, and
wherein if determined that the second application is the specific type of application and the second application is the default browser, a built-in browser of the first application displays the information, and if determined that the second application is not the specific type of application or the second application is not the default browser, the default browser displays the information.

4. The information processing apparatus according to claim 1, wherein the information is help information.

5. The information processing apparatus according to claim 4,
wherein determine further determines whether a display mode of the operating system is a window mode or a tablet mode, and
wherein if determined that the display mode of the operating system is the tablet mode, a print setting section that is an area for performing a print setting is displayed together with the help information.

6. A control method comprising:
accepting, on a print setting screen provided by a first application, an instruction causing a browser to display information; and
determining, if the accepting accepts the instruction causing the browser to display the information, whether a second application that has issued a print instruction to a printer driver is a default browser of an operating system;
wherein if the determining determines that the second application is the default browser, the first application displays the information, and if the determining determines that the second application is not the default browser, the default browser displays the information.

7. The control method according to claim 6, wherein in displaying the information by the first application, the first application opens a file with an extension associated with the first application and displays the information based on the file by a built-in browser.

8. The control method according to claim 6,
wherein the determining further determines whether the second application is a specific type of application and the second application is the default browser of the operating system, and
wherein if the determining determines that the second application is the specific type of application and the second application is the default browser, a built-in browser of the first application displays the information, and if the determining determines that the second application is not the specific type of application or the second application is not the default browser, the default browser displays the information.

9. The control method according to claim 6, wherein the information is help information.

10. The control method according to claim 9,
wherein the determining further determines whether a display mode of the operating system is a window mode or a tablet mode, and
wherein if the determining determines that the display mode of the operating system is the tablet mode, a print setting section that is an area for performing a print setting is displayed together with the help information.

11. A non-transitory recording medium storing instructions for a computer to execute:
accepting, on a print setting screen provided by a first application, an instruction that causing a browser to display information; and
determining, if the accepting accepts the instruction causing the browser to display the information, whether a second application that has issued a print instruction to a printer driver is a default browser of an operating system;
wherein if the determining determines that the second application is the default browser, the first application displays the information, and if the determining determines that the second application is not the default browser, the default browser displays the information.

* * * * *